United States Patent
Blackwell et al.

(10) Patent No.: US 8,667,006 B2
(45) Date of Patent: Mar. 4, 2014

(54) RAPID PEER NAVIGATION IN FACETED SEARCH SYSTEMS

(75) Inventors: Jason Matthew Blackwell, Vestal, NY (US); John Hans Handy-Bosma, Cedar Park, TX (US); Lauren Sarah Lyn, Torrington, CT (US); Brian Craig Meyer, Louisville, CO (US); James Caldwell Porter, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 12/608,318

(22) Filed: Oct. 29, 2009

(65) Prior Publication Data

US 2011/0106834 A1 May 5, 2011

(51) Int. Cl.
G06F 17/00 (2006.01)

(52) U.S. Cl.
USPC ............ 707/769; 707/713; 707/754; 715/768

(58) Field of Classification Search
None
See application file for complete search history.

(56) References Cited

U.S. PATENT DOCUMENTS

| | | | |
|---|---|---|---|
| 7,818,683 B2 * | 10/2010 | Sorin et al. | 715/768 |
| 2006/0085391 A1 | 4/2006 | Turski et al. | |
| 2007/0094241 A1 | 4/2007 | M. Blackwell et al. | |
| 2007/0106658 A1 | 5/2007 | Ferrari et al. | |
| 2007/0226189 A1 | 9/2007 | Piekos et al. | |
| 2008/0082509 A1 | 4/2008 | Bessieres et al. | |
| 2008/0086451 A1 | 4/2008 | Torres et al. | |
| 2008/0104032 A1 | 5/2008 | Sarkar | |
| 2008/0154883 A1 | 6/2008 | Chowdhury et al. | |
| 2008/0295008 A1 | 11/2008 | Kujda et al. | |
| 2009/0037848 A1 | 2/2009 | Tewari et al. | |
| 2009/0112785 A1 | 4/2009 | Achlioptas | |
| 2009/0327271 A1 * | 12/2009 | Amitay et al. | 707/5 |
| 2010/0023555 A1 * | 1/2010 | Macaskill | 707/104.1 |
| 2010/0161441 A1 * | 6/2010 | Hounsell | 705/26 |

OTHER PUBLICATIONS

Roy et al., "DynaCet: Building Dynamic Faceted Search Systems Over Databases" US, 2009, IEEE International Conference on Data Engineering, Mar.-Apr. 2009, pp. 1463-1466.

* cited by examiner

*Primary Examiner* — Belix M Ortiz Ditren
(74) *Attorney, Agent, or Firm* — Yee & Associates, P.C.; John R. Pivnichny

(57) ABSTRACT

A facet peer category navigation system enables enhanced navigation of a faceted search system by a facet peer agent enabled enhanced navigation of a faceted search system by identifying a plurality of targets in a database searchable by a faceted search system. A web page configured to run the faceted search system is displayed, and responsive to a display of a target anywhere on the web page and to an activation of a control associated with the target, a list of all peer targets of the target is displayed in a window on the web page.

21 Claims, 14 Drawing Sheets

RAPID PEER NAVIGATION IN FACETED SEARCH SYSTEMS

BACKGROUND

1. Field:

The disclosure relates generally to database searching through faceted search systems and more specifically to rapid navigation of peer listings on web sites providing faceted search capabilities.

2. Description of the Related Art

When performing faceted searches on a web page, searchers narrow search results by selecting "categories" to filter search results. The searcher is not limited to simply drilling down into a single category. Faceted searches typically allow cross-facet searches, so that not only can the searcher go several levels deep into a single facet, the searcher can also make selections from multiple facets. Each selected category is displayed in a "breadcrumb trail" for purposes of navigating forward and back along the trail. Each selected category displays a list of peer categories, usually in a hierarchal list displayed on a left side of a web page, while the breadcrumb trail is displayed in an upper portion of the web page. Search results are usually displayed beneath the breadcrumb trail and to the right of the category list. When a searcher navigates back along the breadcrumb trail and selects a different peer category, the breadcrumb trail will change accordingly.

Faceted searching is most efficient when content is well categorized, when all of the categories are readily understood by the searcher, or when the searcher knows specific characteristics of what is being sought. Faceted searching is less efficient for searchers who do not know specific characteristics of what they are seeking, and who browse through the hierarchal levels by going back and forth between levels to examine new links. When this happens, searchers backtrack on the breadcrumb trail by clicking on a previous category to see the peer list for that category. The searcher can then select a different peer category and drill down in a new direction. The breadcrumb trail changes in accordance with the searcher's selections. Each time the searcher backtracks, a click is required to cause the peer list for category to appear. Moreover, each time a path is changed, a new page must be loaded. Additionally, within a selected path a searcher may use a keyword search and get null results for a novel word in the selected path. In order to search the novel word in other areas, the searcher would have to backtrack along the breadcrumb trail.

Thus, a problem exists that whenever the searcher wants to check the results of an alternative peer path. In order to check the alternate peer path, the searcher must go back to a parent category and choose an alternate peer category, click on that category, and then choose a new path from a newly displayed web page. For searchers unfamiliar with a particular facet system, this is a problem because the searcher must rely on memory. Even if the searcher remembers that there was a desired alternative path, the searcher may not remember at which level the desired path is located. Thus, with unfamiliar taxonomies, the searcher will spend a great deal of time loading pages and searching alternative paths.

Currently, searchers of a faceted search system are confined to the serial selection of items within a category hierarchy. If a searcher decides to change a category selection within the path, the searcher must navigate back up the category hierarchy path requiring a large number of clicks and page reloads, hoping to make the "right" selection the next time they build their search. Thus, a need exists for a way to eliminate clicks and page downloads in order to speed the search process and to allow a searcher to take advantage of suggestions offered by the navigation structure.

SUMMARY

According to one embodiment of the facet peer category navigation system, a facet peer agent enables enhanced navigation of a faceted search system by identifying a plurality of targets in a database searchable by a faceted search system. A web page configured to run the faceted search system is displayed, and responsive to a display of a target anywhere on the web page and to an activation of a control associated with the target, a list of all peer targets of the target is displayed in a window on the web page.

DETAILED DESCRIPTION

Figure 1:
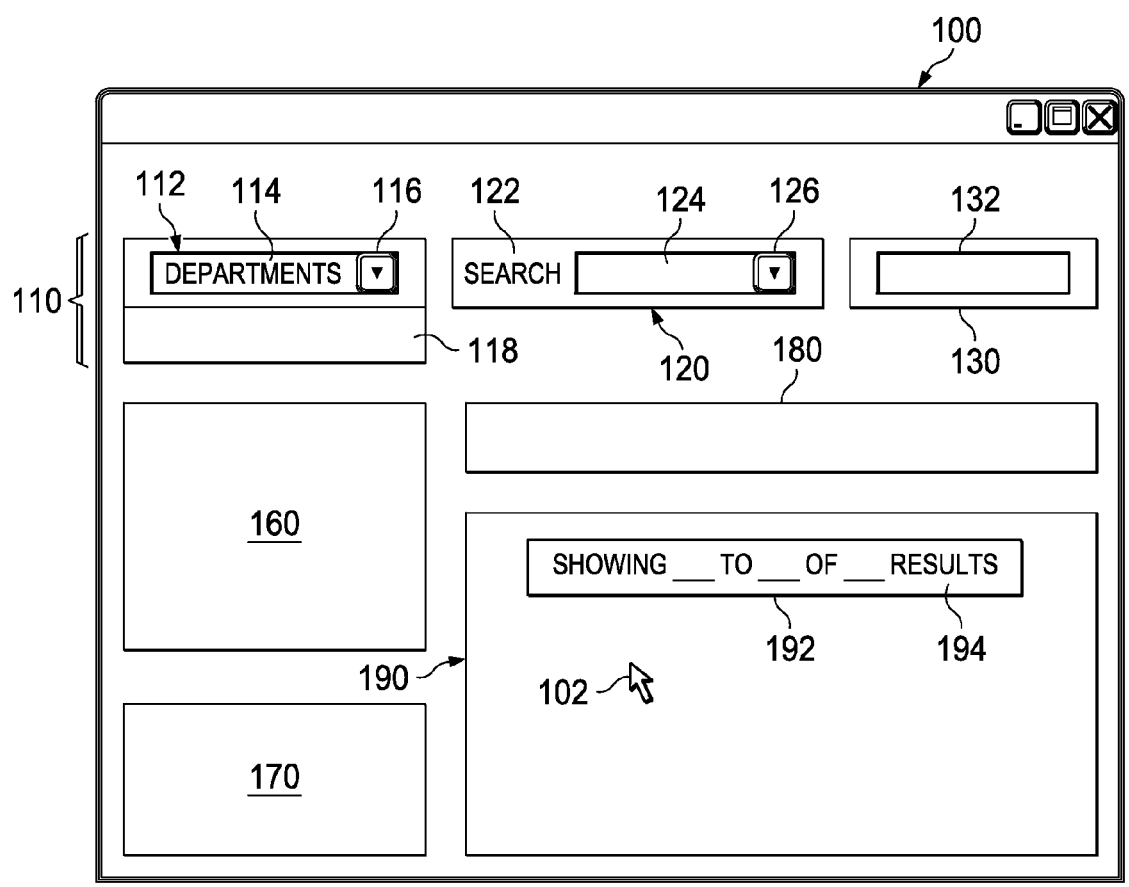
FIG. 1 is an exemplary prior art web page configured for a facet search.

Faceted searches are conducted on search web pages such as prior art search web page 100 of FIG. 1. Prior art search web page 100 is shown as an example and persons skilled in the art are aware that a search page can be configured in any number of configurations. In order to facilitate searches, prior art search web page 100 has a number of areas for entering search criteria and a number of areas for displaying category lists and results. Prior art search web page 100 has department area 112, category area 120, key word area 130, category list area 160, cross category list area 170, breadcrumb trail area 180, and results area 190. Results area 190 has summary area 192. Department area 112 has department control 116 for displaying a drop down list of departments (not shown) so that after a department is selected from the drop down list, the selected department is displayed in department window 118. Category area 120 has category control 126 for displaying a drop down list of categories (not shown) and after selection of a category from the drop down list, the selected category is displayed in search category display area 124. Key word area 130 has key word window 132 where a searcher can enter a keyword to be used as a filter for a search. Category list area 160 displays a hierarchal list of categories with the current peer categories expanded (not shown). Cross category list area 170 displays a hierarchal list of cross categories with the current peer cross categories expanded (not shown). By way of example, when a searcher selects a department, a search category, and enters a keyword, the selections will appear in a breadcrumb trail displayed in breadcrumb trail area 180. Correspondingly, category list area 120 can be sued to select categories and sub-categories. Likewise, cross category list area 170 can be used to select cross categories and cross sub-categories. Each time a search criteria is entered and applied, the web page will reload and category list area 160, cross category list area 170, results area 190 and breadcrumb trail area 180 will change to reflect the current search criteria.

Figure 2:
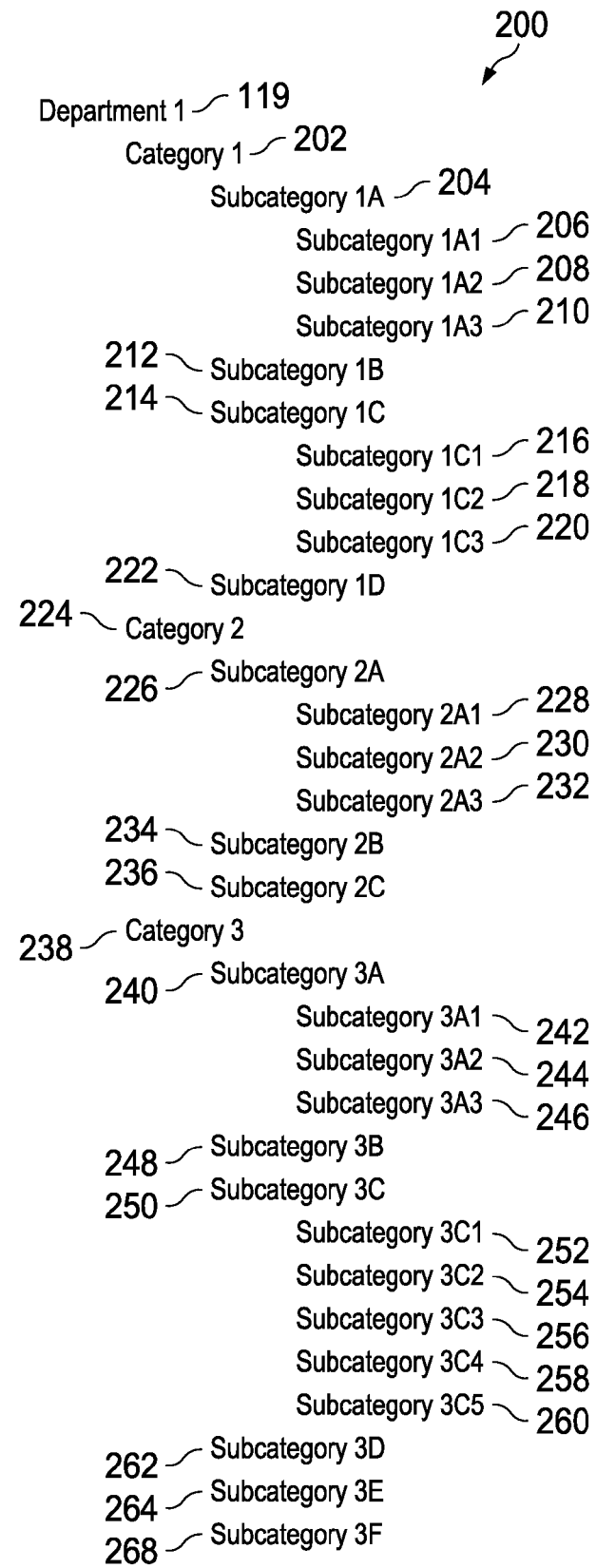
FIG. 2 is an exemplary prior art facet hierarchy.

FIG. 2 is exemplary database organization 200. Database organization 200 has a single department, Department 1 119 and three categories: Category 1 202, Category 2 224, and Category 3 238. Category 1 202 has Subcategory 1A 204, Subcategory 1B 212, Subcategory 1C 214, and Subcategory 1D 222. Subcategory 1A 204 has Subcategory 1A1 206, Subcategory 1A2 208 and Subcategory 1A3 210. Subcategory 1C 214 has Subcategory 1C1 216, Subcategory 1C2 218, and Subcategory 1C3 220. Category 2 224 has Subcategory 2A 226, Subcategory 2B 234, and Subcategory 2C 236. Subcategory 2A 226 has Subcategory 2A1 228, Subcategory 2A2 230 and Subcategory 2A3 232. Category 3 238 has Subcategory 3A 240, Subcategory 3B 248, Subcategory 3C 250, Subcategory 3D 262, Subcategory 3E 264, and Subcategory 3F 268. Subcategory 3A 240 has Subcategory 3A1 242, Subcategory 3A2 244, and Subcategory 3A3 246. Subcategory 3C 250 has Subcategory 3C1 252, Subcategory 3C2 254, Subcategory 3C3 256, Subcategory 3C4 258, and Subcategory 3C5 260. Persons skilled in the art are aware that database organizations can involve any number of data items organized in any size and complexity so that drilling down within the database can require large numbers of selections. Database organization is set forth by way of example only, and not by way of limitation, in order to illustrate the operation of the peer category navigation system.

Figure 3:
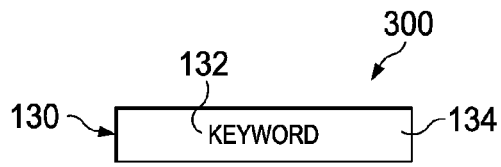
FIG. 3 is an exemplary keyword window.
Figure 4:
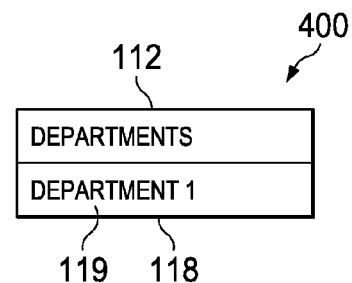
FIG. 4 is an exemplary department window.
Figure 5:
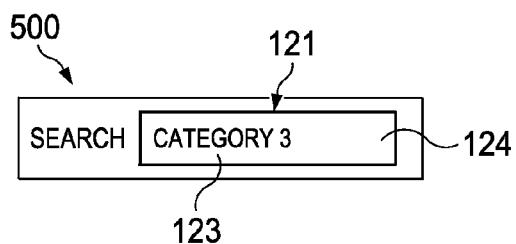
FIG. 5 is an exemplary search category window.
Figure 6:
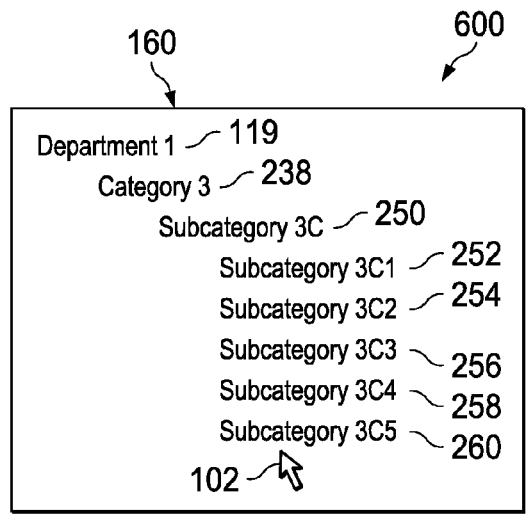
FIG. 6 is an exemplary peer category list window.
Figure 7:
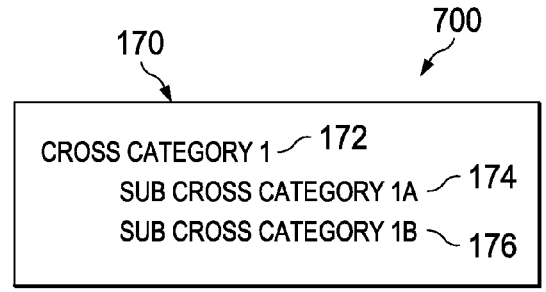
FIG. 7 is an exemplary cross category list window.
Figure 8:
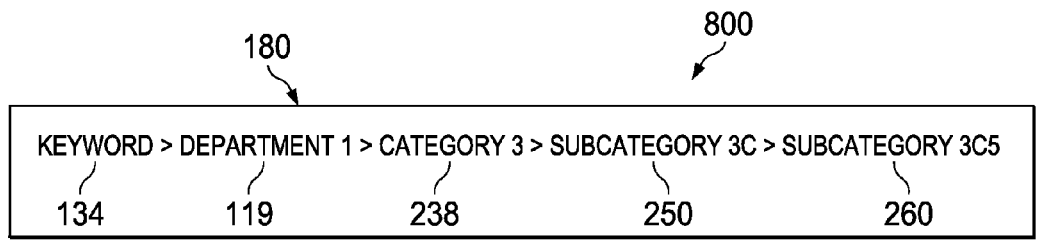
FIG. 8 is an exemplary breadcrumb trail window.

FIGS. 3 through 8 further illustrate the operation of prior art search web page 100 for searching data base organization 200 by showing additional details of the search areas. FIG. 3 is keyword display 300 with keyword 134 entered in keyword display area 132 of keyword area 130. FIG. 4 is department display 400 with department area 112 showing selection of Department 1 119 in department window 118. FIG. 5 is category display 500 showing Category 3 123 selected and displayed in category display area 124 of category window 121. FIG. 6 is category list display 600 with a portion of database organization 200 reflecting the selections of Department 1 119 and Category 3 238 as shown in department display 400 and category display, and further showing selection by a searcher of Subcategory 3C 250 from a listing of Subcategories 3A through 3F (not shown). When the searcher selects Subcategory 3C 250, Subcategories 3C1 252, Subcategory 3C2 254, Subcategory 3C3 256, Subcategory 3C4 258, and Subcategory 3C5 260 are displayed in category list area 160. FIG. 7 is cross category list display 700 having cross category 1 172 and Sub Cross Category 1A 174 and Sub Cross Category 1B 176 displayed in cross category list area 170. Breadcrumb trail display 800 in FIG. 8 is breadcrumb trail area 180 showing the sequence of selections made by a searcher. The searcher first chose keyword 134, then chose Department 1 119, Category 3 238, Subcategory 3C 250, and Subcategory 3C5 260 in that sequence.

FIGS. 1 through 8 illustrate the problem that exists when the searcher wants to check the results of an alternative peer path. If the searcher has not found the desired information in Subcategory 3C5 260 from results that would be displayed in results area 190, the searcher may want to search in Subcategory 3A 240. In order to check Subcategory 3A 240, the searcher must go back to a parent category. In this example, the parent category is Category 3 238 and going back to Category 3 238 will cause Subcategories 3A 240 through 3F 268 to be displayed in category list area 160. The searcher can then choose Subcategory 3A 240 which will cause Subcategories 3A1 242 through 3A3 246 to display in category list area 160. In order to traverse back, the searcher uses breadcrumb trail display 800 and clicks on Category 3 238. The searcher's navigation back up the category hierarchy path requires a number of clicks and page reloads. The facet peer category navigation system solves this problem by eliminating clicks and page downloads, thereby speeding the search process while allowing a searcher to take advantage of suggestions offered by the navigation structure. The facet peer navigation system speeds navigation by configuring the search system to display all peer categories of an element by activating a control associated with each element in the system. Thus, in the above example, the searcher would need only to activate a control associated with Category 3C 250 in breadcrumb trail 180 to cause all peer elements of Category 3C 250 to be displayed. The facet peer category navigation system is described below.

As will be appreciated by one skilled in the art, the facet peer category navigation system may be embodied as a system, method or computer program product. Accordingly, the facet peer category navigation system may take the form of an entirely hardware embodiment, an entirely software embodiment (including firmware, resident software, micro-code, etc.) or an embodiment combining software and hardware aspects that may all generally be referred to herein as a "circuit", "module", or "system." Furthermore, the facet peer category navigation system may take the form of a computer-program product embodied in any tangible medium of expression having computer-usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction operation system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the facet peer category navigation system may be written in any combination of one or more programming languages, including an object oriented programming language such as Java, Smalltalk, C++ or the like and conventional procedural programming languages, such as the "C" programming language or similar programming languages. The program code may execute entirely on the searcher's computer, partly on the searcher's computer, as a stand-alone software package, partly on the searcher's computer and partly on a remote computer or entirely on the remote computer or server. In the latter scenario, the remote computer may be connected to the searcher's computer through any type of network, including a local area network (LAN) or a wide area network (WAN), or the connection may be made to an external computer (for example, through the Internet using an Internet Service Provider).

The facet peer category navigation system is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 9:
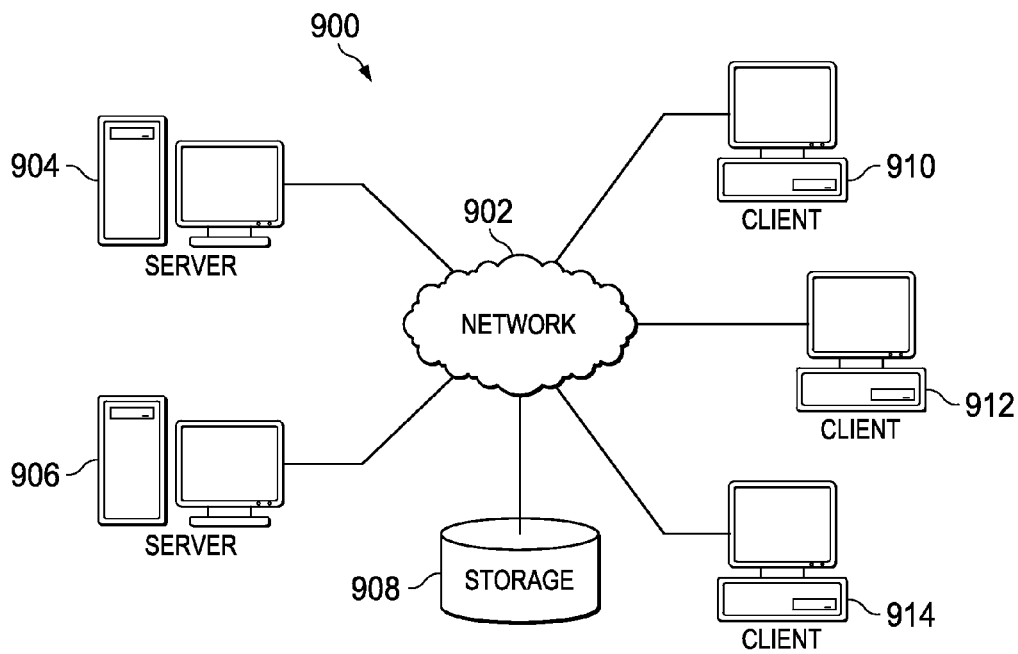
FIG. 9 in an exemplary computer network.
Figure 10:
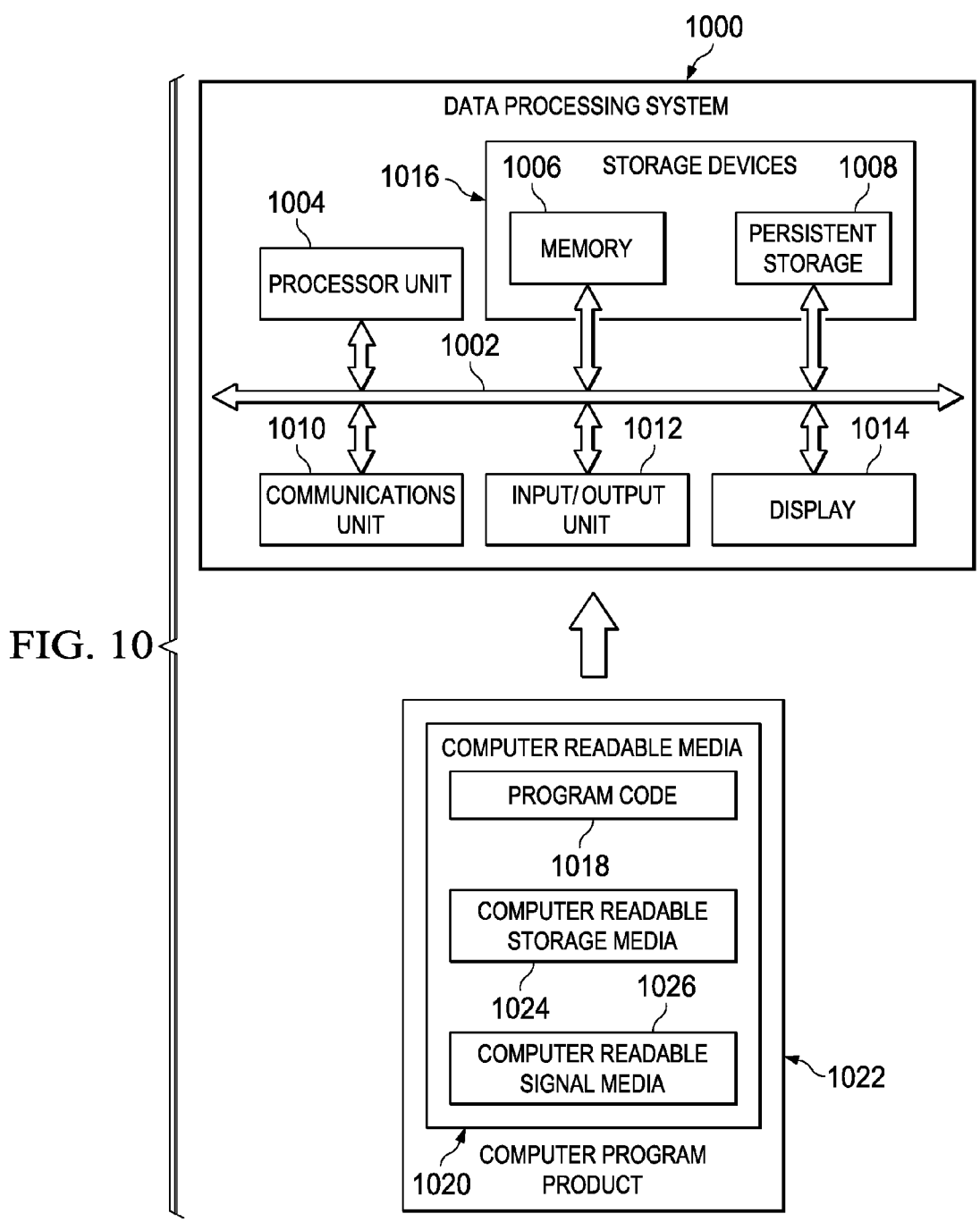
FIG. 10 is an exemplary data processing system.

With reference now to the figures and in particular with reference to FIGS. 9 and 10, exemplary diagrams of data processing environments are provided in which illustrative embodiments may be implemented. It should be appreciated that FIGS. 9 and 10 are only exemplary and are not intended to assert or imply any limitation with regard to the environments in which different embodiments may be implemented. Many modifications to the depicted environments may be made.

FIG. 9 depicts a pictorial representation of a network of data processing systems in which illustrative embodiments may be implemented. Network data processing system 900 is a network of computers in which the illustrative embodiments may be implemented. Network data processing system 900 contains network 902, which is the medium used to provide communications links between various devices and computers connected together within network data processing system 900. Network 902 may include connections such as wire, wireless communication links, or fiber optic cables.

In the depicted example, server 904 and server 906 connect to network 902 along with storage unit 908. In addition, clients 910, 912, and 914 connect to network 902. Clients 910, 912, and 914 may be, for example, personal computers or network computers. In the depicted example, server 904 provides information such as boot files, operating system images, and applications to clients 910, 912, and 914. Clients 910, 912, and 914 are clients to server 904 in this example. Network data processing system 900 may include additional servers, clients, and other devices not shown.

Program code located in network data processing system 900 may be stored on a computer recordable storage medium and downloaded to a data processing system or other device for use. For example, program code may be stored on a computer recordable storage medium on server 904 and downloaded to client 910 over network 902 for use on client 910.

In the depicted example, network data processing system 900 is the Internet with network 902 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 900 also may be implemented as a number of different types of networks, such as for example, an intranet, a local area network (LAN), or a wide area network (WAN). FIG. 9 is intended as an example, and not as an architectural limitation, for the different illustrative embodiments.

With reference now to FIG. 10, a diagram of a data processing system is depicted in accordance with an illustrative embodiment. Data processing system 1000 is an example of a computer, such as server 904 or client 910 in FIG. 9, in which computer usable program code or instructions implementing the processes may be located for the illustrative embodiments. In this illustrative example, data processing system 1000 includes communications fabric 1002, which provides communications between processor unit 1004, memory 1006, persistent storage 1008, communications unit 1010, input/output (I/O) unit 1012, and display 1014.

Processor unit 1004 serves to execute instructions for software that may be loaded into memory 1006. Processor unit 1004 may be a set of one or more processors or may be a multi-processor core, depending on the particular implementation. Further, processor unit 1004 may be implemented using one or more heterogeneous processor systems, in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Memory 1006, in these examples, may be, for example, a random access memory, or any other suitable volatile or non-volatile storage device. Persistent storage 1008 may take various forms, depending on the particular implementation. For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 may be removable. For example, a removable hard drive may be used for persistent storage 1008.

Communications unit 1010, in these examples, provides for communication with other data processing systems or devices. In these examples, communications unit 1010 is a network interface card. Communications unit 1010 may provide communications through the use of either or both physical and wireless communications links.

Input/output unit 1012 allows for the input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for operation by processor unit 1004. The processes of the different embodiments may be performed by processor unit 1004 using computer implemented instructions, which may be located in a memory, such as memory 1006.

These instructions are referred to as program code, computer usable program code, or computer readable program code that may be read and run by a processor in processor unit 1004. The program code, in the different embodiments, may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for operation by processor unit 1004. Program code 1018 and computer readable media 1020 form computer program product 1022. In one example, computer readable media 1020 may be computer readable storage media 1024 or computer readable signal media 1026. Computer readable storage media 1024 may include, for example, an optical or magnetic disc that is inserted or placed into a drive or other device that is part of persistent storage 1008 for transfer onto a storage device, such as a hard drive, that is part of persistent storage 1008. Computer readable storage media 1024 also may take the form of a persistent storage, such as a hard drive, a thumb drive, or a flash memory that is connected to data processing system 1000. In some instances, computer readable storage media 1024 may not be removable from data processing system 1000.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 1018 may be downloaded over a network to persistent storage 1008 from another device or data processing system through computer readable signal media 1026 for use within data processing system 1000. For instance, program code stored in a computer readable storage media in a server data processing system may be downloaded over a network from the server to data processing system 1000. The data processing system providing program code 1018 may be a server computer, a client computer, or some other device capable of storing and transmitting program code 1018.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of executing program code. As one example, data processing system 1000 may include organic components integrated with inorganic components and/or may be comprised entirely of organic components excluding a human being. For example, a storage device may be comprised of an organic semiconductor.

As another example, a storage device in data processing system 1000 is any hardware apparatus that may store data. Memory 1006, persistent storage 1008, and computer readable media 1020 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1006 or a cache such as found in an interface and memory controller hub that may be present in communications fabric 1002.

Figure 11:
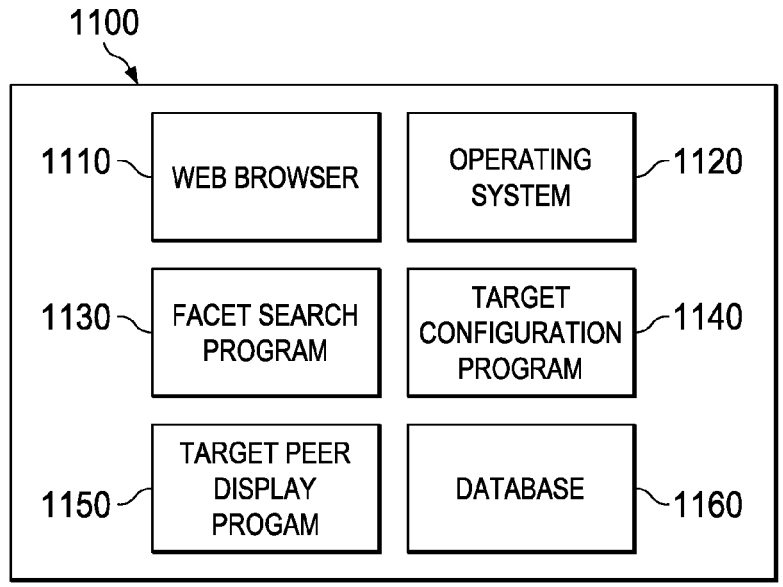
FIG. 11 is an exemplary storage containing software elements of a faceted search system.

FIG. 11 is an exemplary storage containing facet peer category navigation system 1100. Facet peer category navigation system 1100 comprises web browser 1110, operating system 1120, facet search program 1130, target configuration program 1140, target peer agent 1150, and database 1160.

Figure 12:
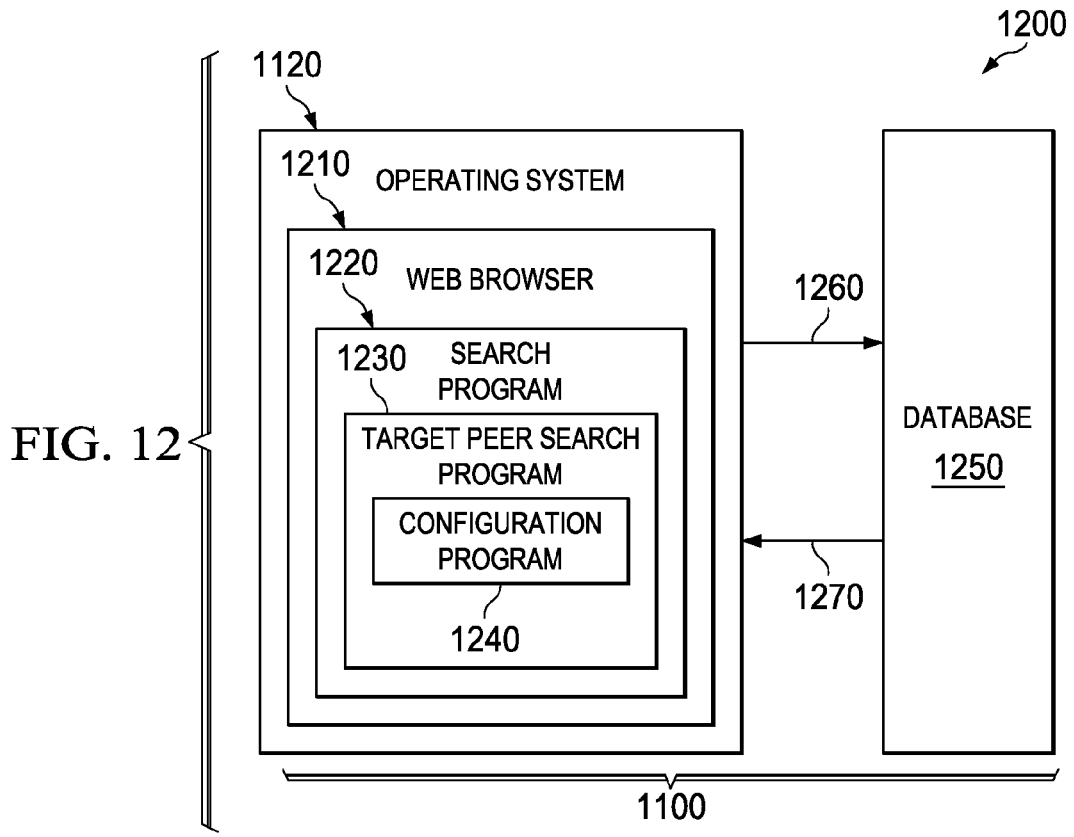
FIG. 12 is a block diagram of the enhanced faceted search system.

FIG. 12 is a block diagram showing configuration 1200 of facet peer category navigation system 1100. Facet peer category navigation system 1100 comprises web browser 1210, search program 1220, target peer search program 1230, and configuration program 1240 which together act to search and retrieve data from database 1250.

Figure 13:
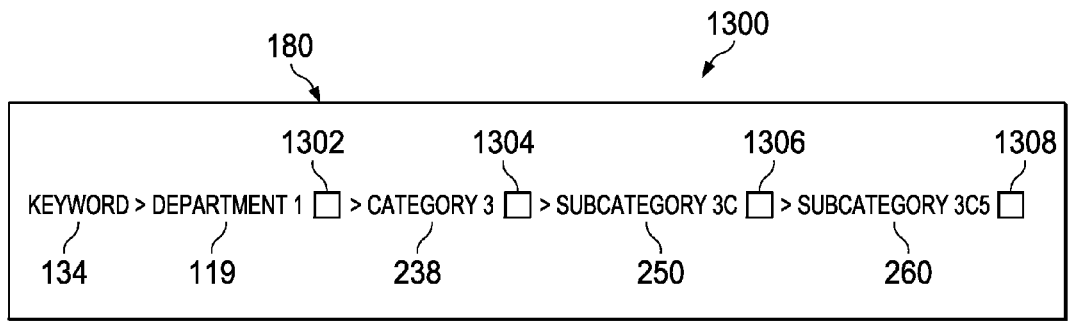
FIG. 13 is an exemplary breadcrumb trail enhanced by a plurality of icon targets.

FIG. 13 is an exemplary breadcrumb trail enhanced by a plurality of icon targets. Breadcrumb trail display 1300 shows the same breadcrumb trail as prior art breadcrumb trail display 800, but each element in the breadcrumb display has been adapted for an enhanced operation by facet peer category navigation system 1100. As explained above, when an element in the breadcrumb display is clicked on, the web page will reload and the display will reconfigure to go back to that selection as though that selection had just been made. However, in this embodiment, facet peer category navigation system 1100 has enhanced the prior art display by configuring each element in database organization 200 to have an icon associated with it. Thus, when organizational elements or other filters such as keywords are selected, entered, and displayed in a breadcrumb trail each element displayed next to the element. The icon is a control that will respond to a hover of the cursor and cause a peer category list to be displayed on the current web page without a click or page reload. Department 1 119 has department icon 1302, category 3 238 has category 3 icon 1304, subcategory 3C 250 has subcategory 3C icon 1306, and subcategory 3C5 260 has subcategory 3C5 icon 1308. Facet peer category navigation system 1100 has changed the elements in the database organization so that each element is a target that responds to a cursor hover as will be shown in FIG. 14. As used herein, the term target shall mean an element of a database organization configured to respond to a cursor hover by displaying a list of the peer categories, if any, corresponding to the element of the data base organization.

Figure 14:
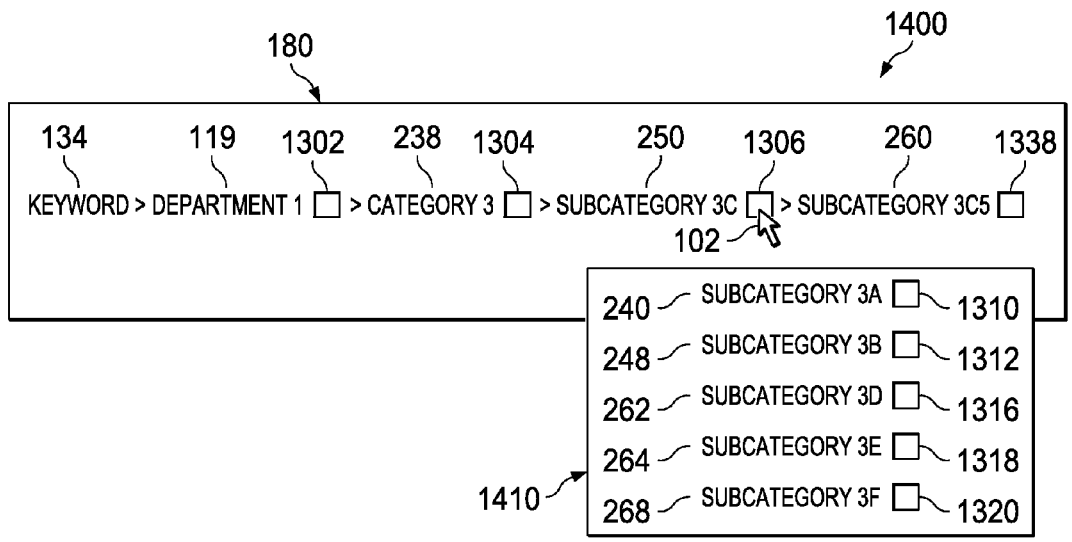
FIG. 14 is an exemplary breadcrumb trail displaying a peer category list after activation of a target icon in the breadcrumb trail.

FIG. 14 is an exemplary breadcrumb trail displaying a peer category list after activation of a target icon in the breadcrumb trail. In this case, cursor 102 is placed in a hover position above category 3C icon 1306. Subcategory 3C 250's icon 1306 is a target and responds to the cursor hover by opening window 1410 populated with all peer subcategories of subcategory 3C 250. The peer categories of subcategory 3C 250 are Subcategory 3A 240, Subcategory 3B 248, Subcategory 3D 262, Subcategory 3E 264, and Subcategory 3F 268. Subcategory 3C 250 is the category for which peer categories are being displayed and is not listed. Because facet peer category navigation system 1100 has configured all elements in database organization 200, Subcategory 3A 240 through Subcategory 3F 268 displayed in window 1410 have corresponding icons. The corresponding icons are Subcategory 3A icon 1310, Subcategory 3B icon 1312, Subcategory 3D icon 1316, Subcategory 3E icon 1318 and Subcategory 3F icon 1320. Keyword 134 is not part of database organization 200 and so is not configured for an icon. Subcategory 3A icon 1310, Subcategory 3B icon 1312, Subcategory 3D icon 1316, Subcategory 3E icon 1318 and Subcategory 3F icon 1320 displayed in window 1410 function in the same way as targets and will cause their corresponding subcategories to be displayed in a further window if the cursor is moved to hover over any of them.

Figure 15:
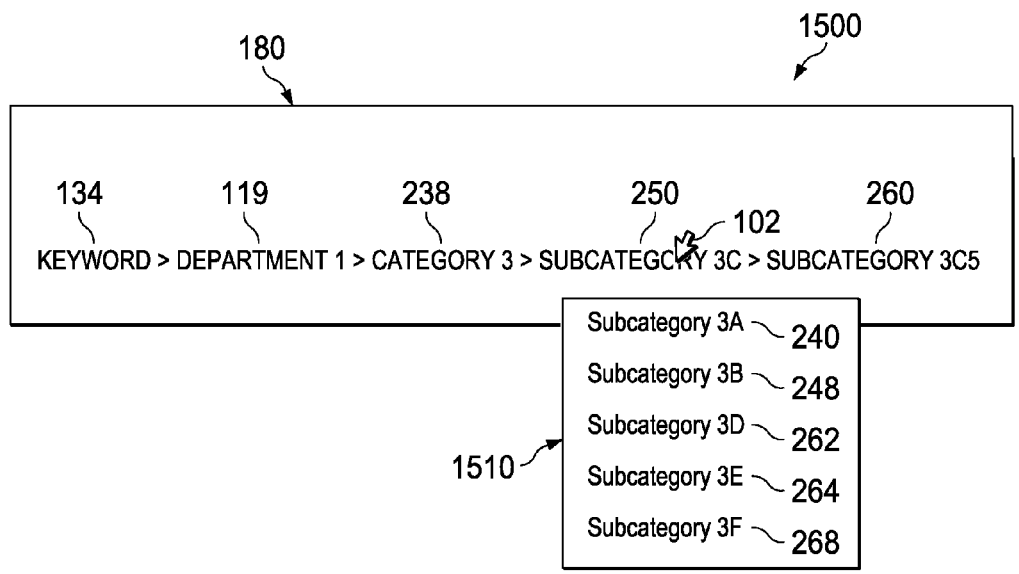
FIG. 15 is an exemplary breadcrumb trail displaying a peer category list with text targets and a peer category list window displayed after activation of a text target in the breadcrumb trail.

FIG. 15 is an exemplary breadcrumb trail displaying a peer category list with text targets and a peer category list window displayed after activation of a text target in the breadcrumb trail. Text targets are an alternate configuration of facet peer category navigation system 1100 in which an additional control device, such as an icon, is not used. Rather, the text of the words in the database organizational elements are used and configured to be the targets. Thus, in FIG. 15 each element in the breadcrumb trail is itself a target configured to respond to a cursor hover by displaying a list of the peer categories, if any, corresponding to the element of the data base organization. In FIG. 15, cursor 102 is hovered over subcategory 3C 250 and window 1510 is displayed containing Subcategory 3A 240 through Subcategory 3F 268. Subcategory 3C 250 is the category for which peer categories are being displayed and is not listed. Each of Subcategory 3A 240, Subcategory 3B 248, Subcategory 3D 262, Subcategory 3E 264 and Subcategory 3F 268 displayed in window 1510 are themselves targets and can function as targets should the cursor over one of them.

Figure 16:
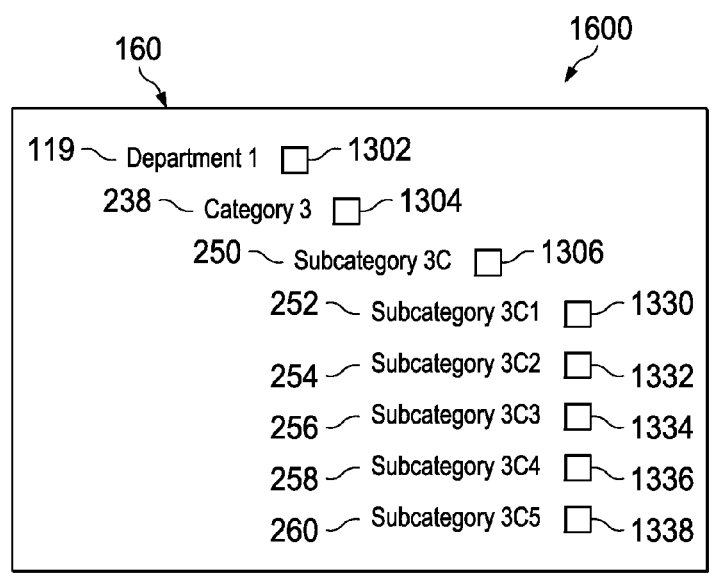
FIG. 16 is an exemplary peer category list window with icon targets.

FIG. 16 is an exemplary peer category list window with icon targets such as would be displayed in category list area 160 of web page 100 (See FIG. 1). Since facet peer category navigation system 1100 has configured the data base organization elements of data base organization 200 when the current data base organization levels are displayed in category list area, each of the database organization elements displayed function as targets and when a cursor is hovered over the element, a window containing all corresponding peer elements will be displayed. Thus, Department 1 119, Category 3 238, Subcategory 3C 250, and the peer categories of Subcategory 3C, Subcategory 3C1 252, Subcategory 3C2 254, Subcategory 3C3 256, Subcategory 3C4 258, Subcategory 3C5 260 are displayed with their icons. Department 1 icon 1302, Category 3 icon 1304, Subcategory 3C icon 1306, Subcategory 3C1 icon 1330, Subcategory 3C2 icon 1332, Subcategory 3C3 icon 1334, Subcategory 3C4 icon 1336, Subcategory 3C5 icon 1338 are displayed in category list display area 160.

Figure 17:
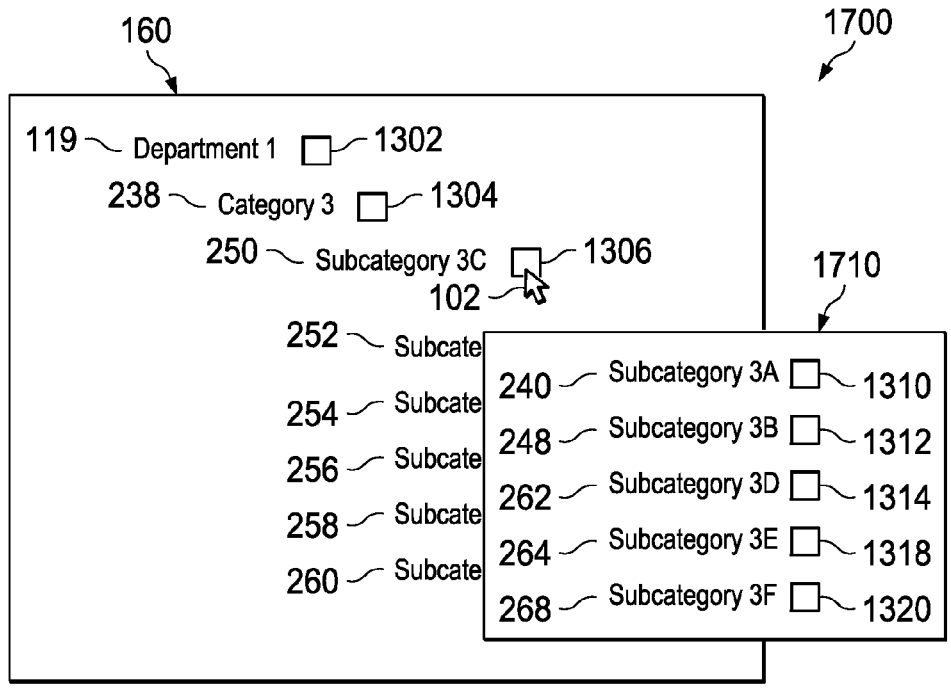
FIG. 17 is an exemplary peer category list window displaying a peer category list after activation of a target icon in the category list.

FIG. 17 is an exemplary peer category list window displaying a peer category list after activation of a target icon in the category list. Display 1700 shows category list area 160 showing Department 1 icon 1302, Category 3 icon 1304, and Subcategory 3C 250's icon 1306. Subcategory 3C1 icon 1330, Subcategory 3C2 icon 1332, Subcategory 3C3 icon 1332, Subcategory 3C4 icon 1334, Subcategory 3C5 icon 1338 cannot be viewed entirely because window 1710 hides these elements. In the example, cursor 102 hovers over Subcategory 3C 250's icon 1306 and window 1710 displays the peer categories and their icons for Subcategory 3C 250. The peer categories displayed are Subcategory 3A icon 1310, Subcategory 3B icon 1312, Subcategory 3D icon 1314, Subcategory 3E icon 1316 and Subcategory 3F icon 1320. Subcategory 3C 250 is the category for which peer categories are being displayed and is not listed.

Figure 18:
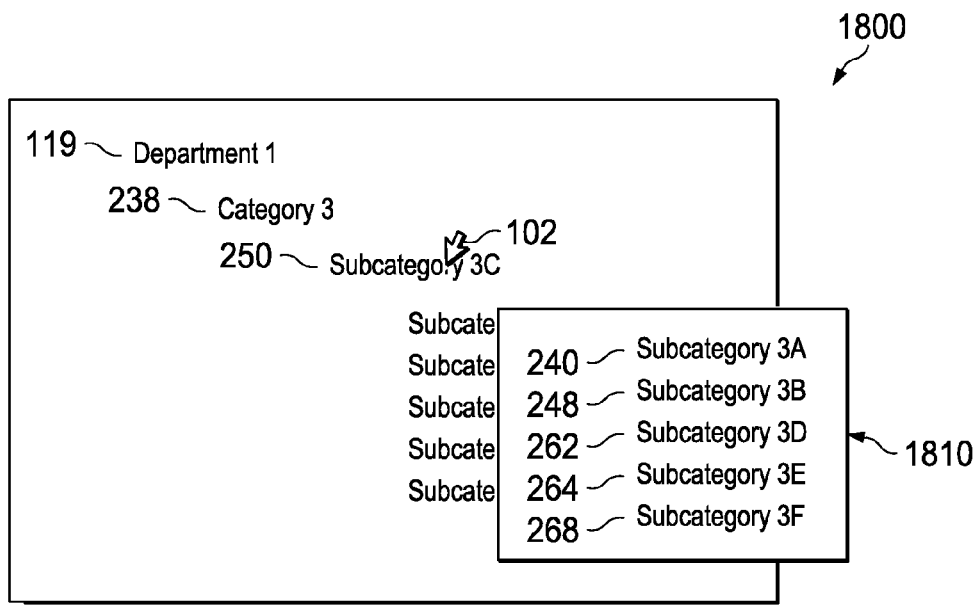
FIG. 18 is an exemplary peer category list window displaying a peer category list after activation of a target text in the category list.

FIG. 18 is an exemplary peer category list window displaying a peer category list after activation of a target text in the category list. In FIG. 18, cursor 102 is hovered over category 3 238 and window 1810 is displayed containing Subcategory 3A 240 through Subcategory 3F 268. Subcategory 3C 250 is the category for which peer categories are being displayed and is not listed. Each of Subcategory 3A 240, Subcategory 3B 248, Subcategory 3D 262, Subcategory 3E 264 and Subcategory 3F 268 displayed in window 1510 are themselves targets and can function as targets should the cursor hover over one of them.

Figure 19:
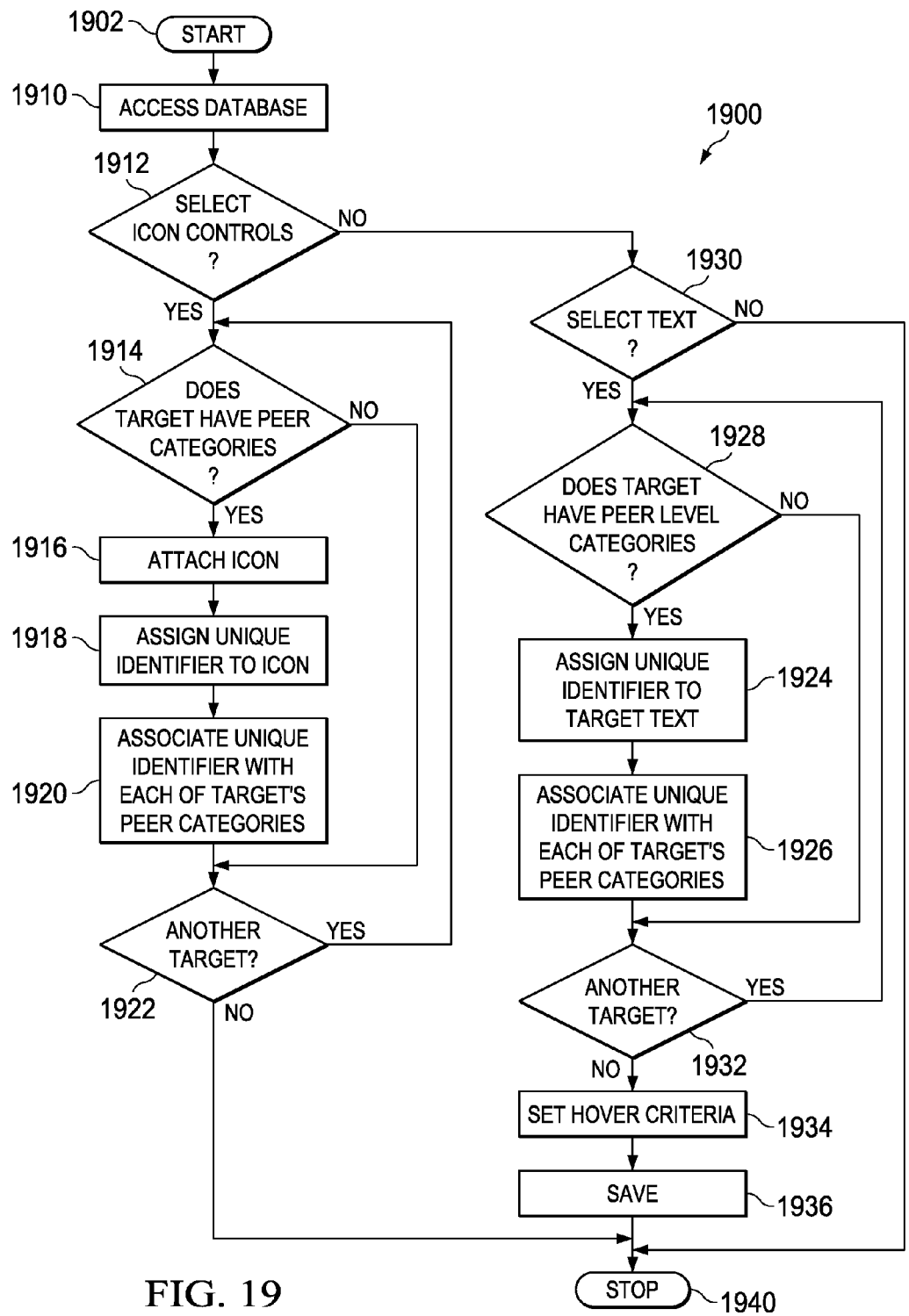
FIG. 19 is a flow chart of a configuration program.

FIG. 19 is a flow chart of configuration program 1900. Configuration program 1900 begins (1902) and accesses a data base (1910). A determination is made whether icon controls are selected (1912). If icon controls are selected, a determination is made whether the target has peer categories (1914). If the target has peer categories, an icon is attached (1916). A unique identifier is assigned to the icon 1918, and the unique identifier is associated with each of the target's peer categories (1920). If the target does not have peer categories, configuration program 1900 goes to step 1922.

If at step 1920 icon controls were not selected, configuration program 1900 determines whether text is to be selected for a target (1930). If text is to be selected for a target, a determination is made whether the target has peer categories (1928). If the target has peer categories, a unique identifier is assigned to the text 1924, and the unique identifier is associated with each of the target's peer categories (1926). If the target does not have peer categories, configuration program goes to step 1932. If at step 1930 text was not selected, configuration program 1900 stops (1940). A determination is made whether another target is in the database organization (1932). If there is another target, configuration program goes to step 1928. If there is not another target, configuration program 1900 sets a hover criteria (1934), saves the configuration (1936), and stops (1940).

Figure 20:
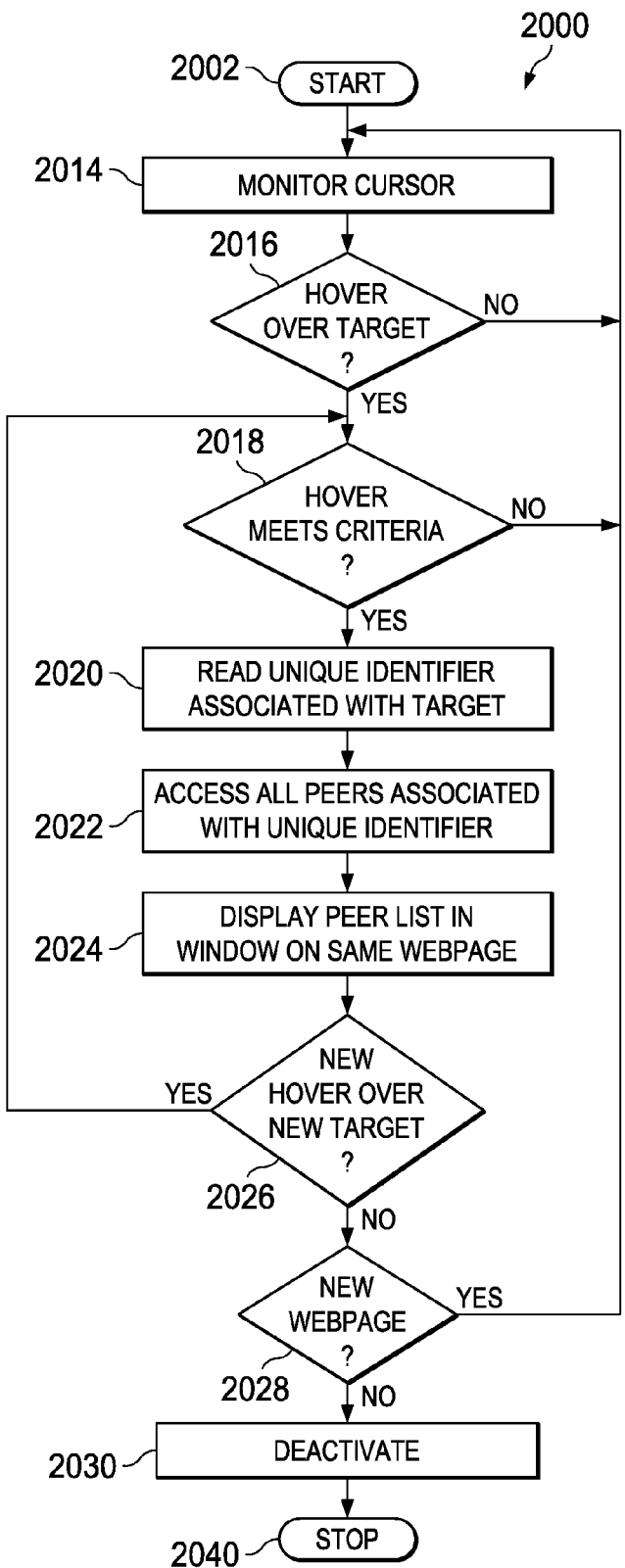
FIG. 20 is a flow chart of a target peer agent program.

FIG. 20 is a flow chart of a target peer agent program. Target peer agent program 2000 begins (2002). Target peer agent program 2000 activates when a facet search web page is opened. Target peer agent program 2000 monitors the cursor on the display of the computer (2014) and determines whether the cursor of the computer hovers over a target (2016). If not, target peer agent program 2000 returns to step 2014 and continues to monitor the cursor. If the cursor is hovering over a target, a determination is made whether the hover meets the criteria (2018). If not, target peer agent program 2000 returns to step 2014 and continues to monitor the cursor. If the hover meets the criteria, target peer agent program 2000 reads the unique identifier associated with the target (2020) and displays the peer list of peer categories in a window on the same web page (2024). A determination is made whether there is a new hover of the cursor over a new target (2026). If so, target peer agent program 2000 returns to step 2018. If not, a determination is made whether a new web page has opened (2028). If so, target peer agent program 2000 goes to step 2014, and if not deactivates (2030) and stops (2040).

Figure 21:
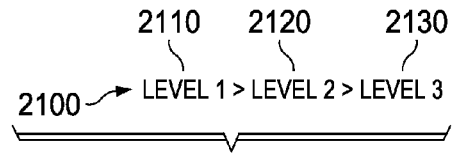
FIG. 21 is an alternate exemplary breadcrumb trail.
Figure 22:
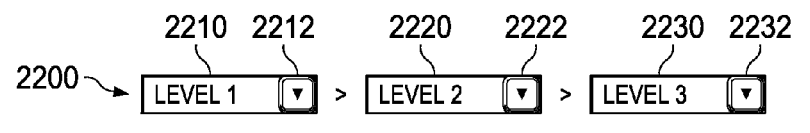
FIG. 22 is an alternate control.

Persons skilled in the art recognize that controls are not limited to text or icons. For example, FIGS. 21 through 24 show additional ways in which display of a peer facet list may be activated. FIG. 21 depicts three terms: Level 1 2110, Level 2 2120, and Level 3 2130 in breadcrumb trail 2100. As discussed above, a corresponding peer facet list can be displayed by hovering a cursor over any of the three terms. FIG. 22 depicts drop down menu controls employed in conjunction with the terms. In breadcrumb trail 2200, first window 2210 has a first term, Level 1, and a first menu control 2212, second window 2220 has a second term, Level 2, and a second menu control 2222, and third window 2230 has a third term, Level 3, and a third menu control 2232.

Activation of the first menu control 2212, by hovering a cursor over or by positioning a cursor over and clicking on first menu control 2212, will cause a peer list corresponding to the term, Level 1 2210, to be presented in substantially the same manner as a drop down menu. Activation of the second menu control 2222, by hovering a cursor over or by positioning a cursor over and clicking on second menu control 2222, will cause a peer list corresponding to the term, Level 2 2220, to be presented in substantially the same manner as a drop down menu. And, in like manner, activation of the third menu control 2232, by hovering a cursor over or by positioning a cursor over and clicking on third menu control 2232, will cause a peer list corresponding to the term, Level 3 2230, to be presented in substantially the same manner as a drop down menu.

Figure 23:
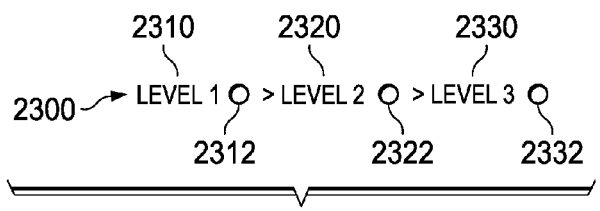
FIG. 23 is an alternate control.

FIG. 23 shows breadcrumb trail 2300 having three terms, each of the terms having an add button following the term. Thus, responsive to hovering a cursor over or clicking on first add button 2312, a peer list corresponding to Level 1 2310 will be displayed, responsive to hovering a cursor over or clicking on second add button 2322, a peer list corresponding to Level 2 2320 will be displayed, and responsive to hovering a cursor over or clicking on third add button 2332, a peer list corresponding to Level 3 2330 will be displayed.

Figure 24:
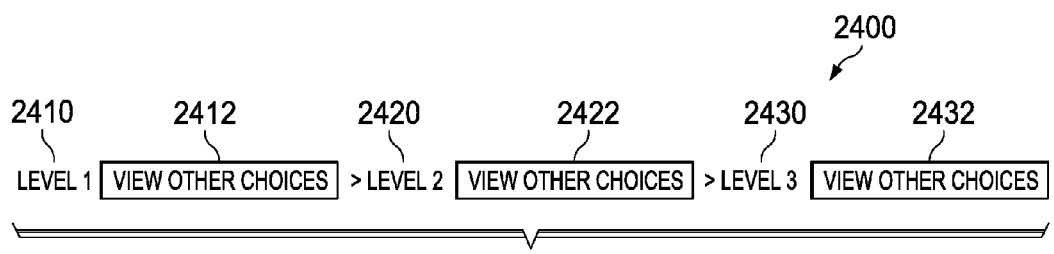
FIG. 24 is an alternate control.
Figure 25:
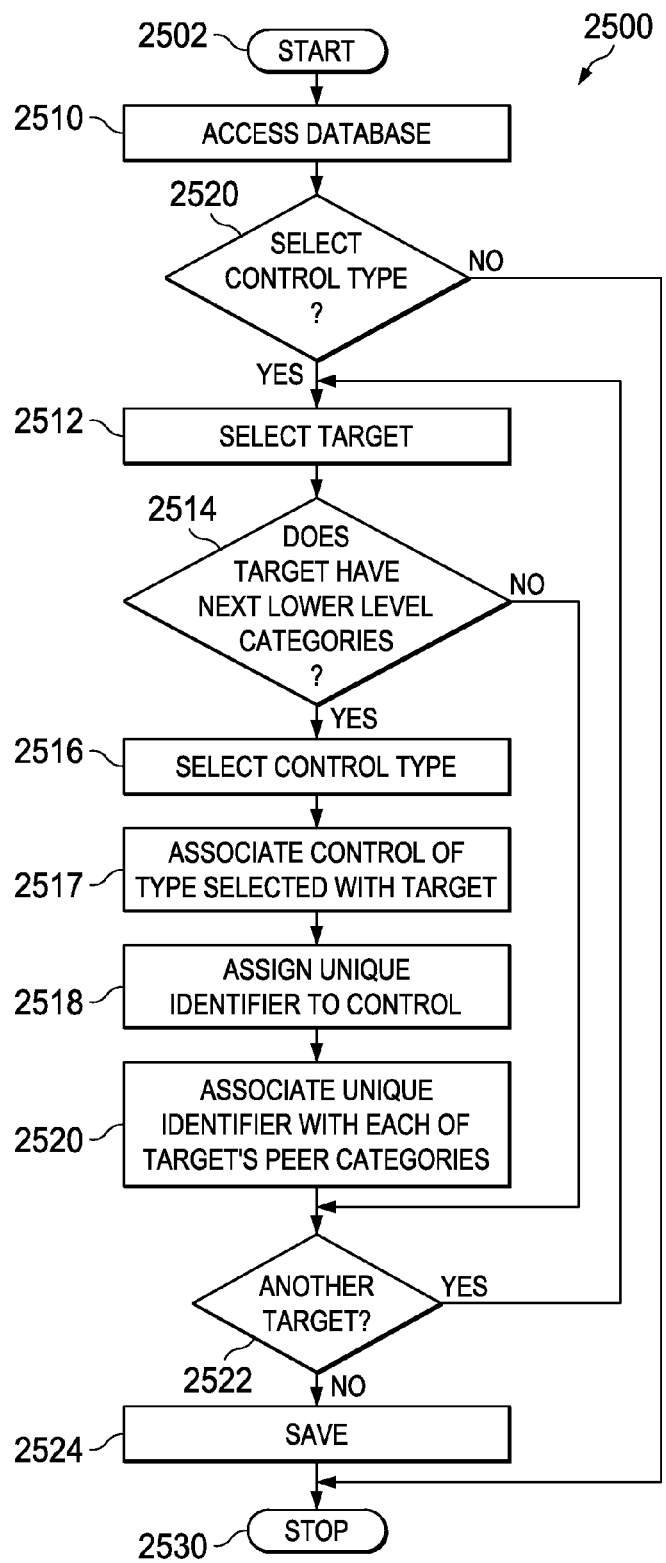
FIG. 25 is a flow chart of an alternate configuration program.

FIG. 24 shows breadcrumb trail 2400 having three terms, each having a control stating "view other choices" following the term. Thus, responsive to hovering a cursor over or clicking on first "view other choice" control 2412, a peer list corresponding to Level 1 2410 will be displayed, responsive to hovering a cursor over or clicking on second "view other choices" control 2422, a peer list corresponding to Level 2 2420 will be displayed, and responsive to hovering a cursor over or clicking on third "view other choices" control 2432, a peer list corresponding to Level 3 2430 will be displayed. FIG. 25 shows a flowchart of alternate configuration program 2500. Alternate configuration program 2500 starts (2502) and accesses the database (2510). A determination is made whether a control type is to be selected for each of the terms in the database (2520). If not, alternate configuration program stops (2530). Responsive to a determination that a control type is to be selected, a target is selected (2512). A determination is made as to whether the target has peer categories (2514). If not, alternate configuration program 2500 goes to step 2522. If so, a control type is selected (2516) and a control of the control type is attached or otherwise associated with the target (2517). One consideration in selecting a control type is that a trigger for activating a control be different from a trigger for activating a normal display of elements in the web page. Therefore, a control type would not have a same activation trigger as the element itself. For example, an element in a breadcrumb trail, when activated, would display the next level elements of the activated breadcrumb trail element. However, a control associated in accordance with the alternate configuration program would be a control that would have a different activation trigger. Thus, to see all peer elements of the element activated, a cursor hover might be selected because a cursor hover would provide a different trigger than clicking on the element. Therefore, each element in the database organization may have two different modes of being activated or of being linked—one for normal operation to display next level elements, and one for display of peer elements. A unique identifier is assigned to the particular control for that target (2518). The unique identifier is associated with each of the target's peer categories (2520). A determination is made whether there is another target (2522). If there is another target, alternate configuration program 2500 goes to step 2512, and if not, alternate configuration program 2500 saves (2524) and stops (2530).

Figure 26:
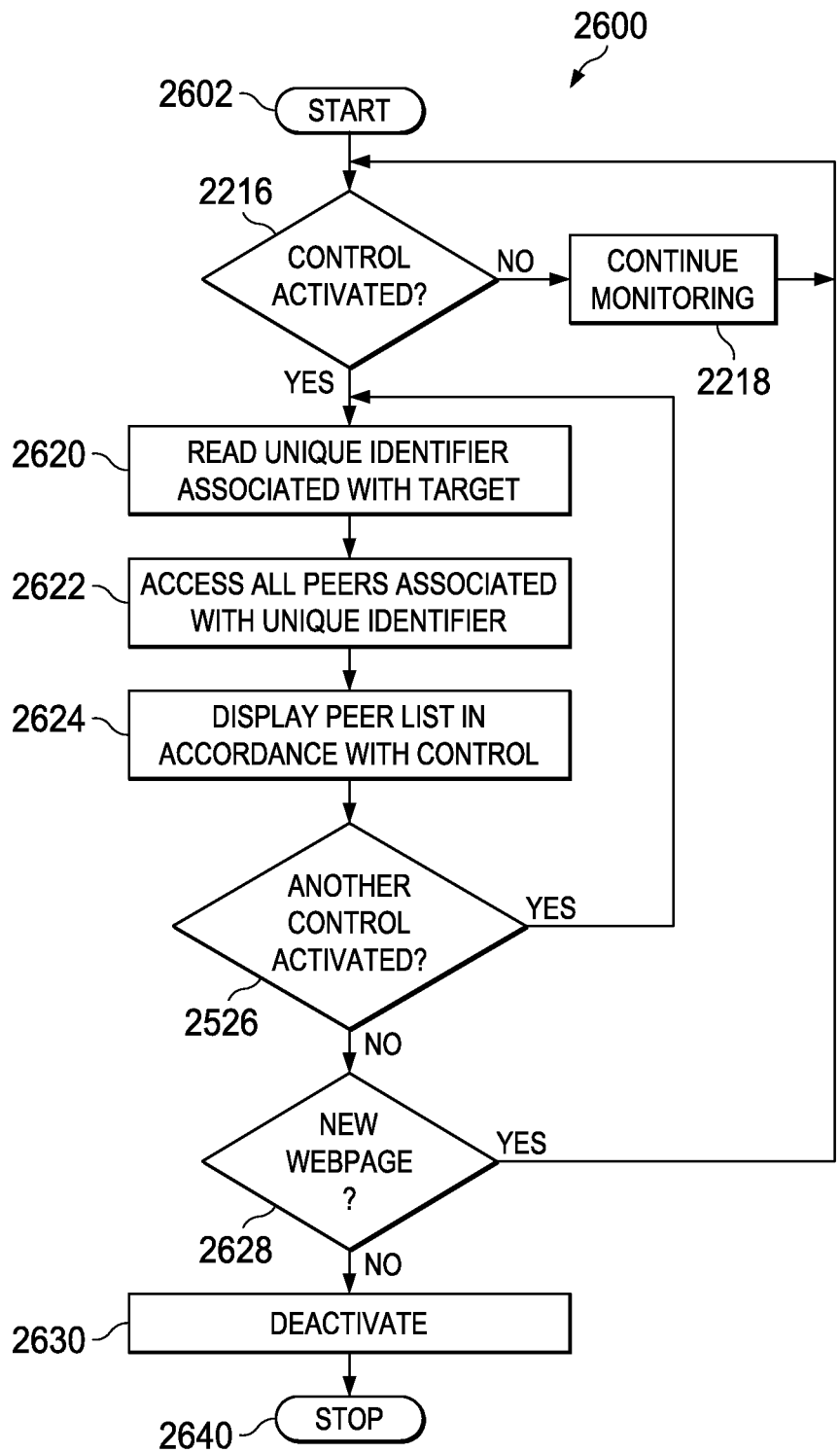
FIG. 26 is a flow chart of an alternate target peer agent program.

FIG. 26 shows a flowchart for alternate target peer agent program 2600. Alternate target peer agent program 2600 starts (2602) and a determination is made whether a control has been activated (2216). If not, alternate target peer agent program 2600 continues monitoring 2218. If a control has been activated, alternate target peer agent program 2600 reads the unique identifier associated with the target (2620). All peer targets associated with the unique identifier are accessed (2622), and a peer target list is displayed in accordance with the control (2624). A determination is made whether another control has been activated (2526), and if so, alternate target peer agent program 2600 returns to step 2620. If not, a determination is made whether a new web page is displayed (2628). If a new web page is displayed, alternate target peer agent program 2600 goes to step 2216, and if not, deactivates (2630) and stops (2640). The control type may be any of those discussed above. Additionally, the control type may be any type of control known to a person skilled in the art suitable for causing a peer list to be displayed.

The flowchart and block diagrams in the figures illustrate the architecture, functionality, and operation of possible implementations of systems, methods and computer program products according to various embodiments of the facet peer category navigation system. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the facet peer category navigation system has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction operation system. For the purposes of this description, a computer-usable or computer readable medium can be any tangible apparatus that can contain, store, communicate, propagate, or transport the program for use by or in connection with the instruction operation system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory used during actual operation of the program code, bulk storage, and cache memories which provide temporary storage of at least some program code in order to reduce the number of times code must be retrieved from bulk storage during operation.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening non-public or public networks. Modems, cable modems, and Ethernet cards are just a few of the currently available types of network adapters.

The description of the facet peer category navigation system has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for navigating a faceted search system, the computer implemented method comprising:

identifying, by a processor of a computer, a plurality of targets in a database searchable by the faceted search system, wherein at least one of the plurality of targets identified in the database has a control associated and configured to respond to a cursor hover and wherein the control has a unique identifier associated therewith when the least one of the plurality of targets identified has peer categories;

displaying, by the processor, a webpage configured to run the faceted search system;

displaying an enhanced breadcrumb trail on the web page, wherein the breadcrumb trail includes a sequence of a plurality of selected ones of the plurality of targets through which a user has navigated including respective controls; and responsive to an activation of the control associated with a particular one of the plurality of selected ones of the plurality of targets, automatically displaying, by the processor, a list of all peer targets of the particular one of the plurality of selected ones of the plurality of targets in a window on the webpage without reloading the web page when the list is displayed.

2. The computer implemented method of claim 1, further comprising:
responsive to hovering a cursor over the particular one of the plurality of selected ones of the plurality of targets and without clicking a mouse button, automatically and simultaneously displaying a plurality of links, wherein each one of the plurality of links corresponds to one of the peer targets of the particular one of the plurality of selected ones of the plurality of targets over which the cursor is hovering.

3. The computer implemented method of claim 1, wherein the activation comprises hovering a cursor over on the particular one of the plurality of selected ones of the plurality of targets.

4. The computer implemented method of claim 3, wherein the hovering includes leaving the cursor over the particular one of the plurality of selected ones of the plurality of targets for a predetermined amount of time.

5. The computer implemented method of claim 1, wherein the control comprises a section of text describing a category in a faceted search hierarchy and having the unique identifier linked to all peer categories of a category identified by the section of text.

6. The computer implemented method of claim 1, wherein the control comprises an icon associated with a category in a faceted search hierarchy and having the unique identifier linked to all peer categories of the category identified by a section of text.

7. A computing system comprising:
a computer, a web server, and a database connected by a network, wherein the computer has a memory and a processor;
a plurality of instructions stored in the memory, the plurality of instructions configured to cause the processor to perform actions of:
identifying, by the processor, a plurality of targets in a database searchable by the faceted search system, wherein each one of the plurality of targets identified in the database has a control associated and configured to respond to a cursor hover and wherein the control has a unique identifier associated therewith when the least one of the plurality of targets identified has peer categories;
displaying, by the processor, a webpage configured to run the faceted search system;
displaying an enhanced breadcrumb trail on the web page, wherein the breadcrumb trail includes a sequence of a plurality of selected ones of the plurality of targets through which a user has navigated including respective controls; and
responsive to activation of the control associated with a particular one of the plurality of selected ones of the plurality of targets, automatically displaying, by the processor, a list of all peer targets of the particular one of the plurality of selected ones of the plurality of targets in a window on the webpage without reloading the web page when the list is displayed.

8. The computing system of claim 7, wherein the plurality of instructions further comprise:
responsive to hovering a cursor over the particular one of the plurality of selected ones of the plurality of targets and without clicking a mouse button, automatically and simultaneously displaying a plurality of links, wherein each one of the plurality of links corresponds to one of the peer targets of the particular one of the plurality of selected ones of the plurality of targets over which the cursor is hovering.

9. The computing system of claim 7, wherein the activation comprises a hovering of a cursor over on the particular one of the plurality of selected ones of the plurality of targets.

10. The computing system of claim 9, wherein the hovering includes leaving the cursor over the particular one of the plurality of selected ones of the plurality of targets for a predetermined amount of time.

11. The computing system of claim 7, wherein the control comprises a section of text describing a category in a faceted search hierarchy and having the unique identifier linked to all peer categories of a category identified by a section of text.

12. The computing system of claim 7, wherein the control comprises an icon associated with a category in a faceted search hierarchy and having the unique identifier linked to all peer categories of the category identified by the section of text.

13. A computer program product, comprising:
one or more computer-readable non-transitory storage devices;
a plurality of instructions stored in the one or more computer-readable non-transitory storage devices, the plurality of instructions configured to cause a processor of a computer to perform actions of:
identifying, by the processor, a plurality of targets in a database searchable by the faceted search system, wherein each one of the plurality of targets identified in the database has a control associated and configured to respond to a cursor hover and wherein the control has a unique identifier associated therewith when the least one of the plurality of targets identified has peer categories;
displaying, by the processor, a webpage configured to run the faceted search system;
displaying an enhanced breadcrumb trail on the web page, wherein the breadcrumb trail includes a sequence of a plurality of selected ones of the plurality of targets through which a user has navigated including respective controls; and
responsive to activation of the control associated with a particular one of the plurality of selected ones of the plurality of targets, automatically displaying, by the processor, a list of all peer targets of the particular one of the plurality of selected ones of the plurality of targets in a window on the webpage without reloading the web page when the list is displayed.

14. The computer program product of claim 13, wherein the plurality of instructions further comprise:
responsive to hovering a cursor over the particular one of the plurality of selected ones of the plurality of targets and without clicking a mouse button, automatically and simultaneously displaying a plurality of links, wherein each one of the plurality of links corresponds to one of the peer targets of the particular one of the plurality of selected ones of the plurality of targets over which the cursor is hovering.

15. The computer program product of claim 13, wherein the activation comprises a hovering of a cursor over the particular one of the plurality of selected ones of the plurality of targets.

16. The computer program product of claim 15, wherein the hovering includes leaving the cursor over the particular one of the plurality of selected ones of the plurality of targets for a predetermined amount of time.

17. The computer program product of claim 13, wherein the control comprises a section of text describing a category in a faceted search hierarchy and having the unique identifier linked to all peer categories of a category identified by the section of text.

18. The computer program product of claim 13, wherein the control comprises an icon associated with a category in a faceted search hierarchy and having the unique identifier linked to all peer categories of the category identified by a section of text.

19. The computer implemented method of claim 1, wherein the plurality of selected ones of the plurality of targets continue to be displayed when the list is displayed.

20. The computer system of claim 7, wherein the plurality of selected ones of the plurality of targets continue to be displayed when the list is displayed.

21. The computer program product of claim 13, wherein the plurality of selected ones of the plurality of targets continue to be displayed when the list is displayed.

* * * * *